(12) United States Patent
Ichimura et al.

(10) Patent No.: US 7,364,208 B2
(45) Date of Patent: Apr. 29, 2008

(54) STRUCTURE FOR CONNECTING TWO MEMBERS, METHOD THEREFOR, AND DIE

(75) Inventors: Nobuo Ichimura, Gunma (JP); Yoshikazu Takamatsu, Sano (JP); Susumu Satou, Gunma (JP)

(73) Assignee: Calsonic Kansei Corporation, Tokyo (JP)

( * ) Notice: Subject to any disclaimer, the term of this patent is extended or adjusted under 35 U.S.C. 154(b) by 168 days.

(21) Appl. No.: 10/717,913

(22) Filed: Nov. 21, 2003

(65) Prior Publication Data

US 2004/0150222 A1 Aug. 5, 2004

(30) Foreign Application Priority Data

Nov. 26, 2002 (JP) ............................ P2002-342787

(51) Int. Cl.
*F16L 13/14* (2006.01)

(52) U.S. Cl. .................. 285/382; 285/203; 29/509; 29/511

(58) Field of Classification Search ................ 285/382, 285/202, 203; 29/509, 511, 520, 523
See application file for complete search history.

(56) References Cited

U.S. PATENT DOCUMENTS 3,374,014 A * 3/1968 Kull et al. .................. 285/382
3,930,298 A * 1/1976 Ridenour .................. 285/382.5
5,596,881 A 1/1997 Wilson et al.
5,743,571 A 4/1998 Gaitros et al.
5,833,280 A 11/1998 Ferlin et al.
6,868,684 B2 * 3/2005 Law et al. .................... 62/225

FOREIGN PATENT DOCUMENTS

| FR | 2 442 391 | 6/1980 |
|---|---|---|
| JP | 54-53716 | 1/1979 |
| JP | 1-171913 U | 12/1989 |
| JP | 3-84291 A | 4/1991 |
| JP | 3-62287 U | 6/1991 |
| JP | 6-047477 A | 2/1994 |
| JP | 6-047478 | 2/1994 |
| JP | 6-123204 A | 5/1994 |
| JP | 2591388 B2 | 12/1996 |
| JP | 9-026064 A | 1/1997 |

* cited by examiner

Primary Examiner—David Bochna
(74) Attorney, Agent, or Firm—Foley & Lardner LLP

(57) ABSTRACT

A structure connects a first member and a second member. The first member has a peripheral wall portion that includes a stepped portion that is engaged with the second member. The peripheral wall portion is a deformed portion that is deformed inwardly of the stepped portion of the first member. The deformed portion has a thin shape that is provided by a cut section of the peripheral wall portion.

9 Claims, 15 Drawing Sheets

↓

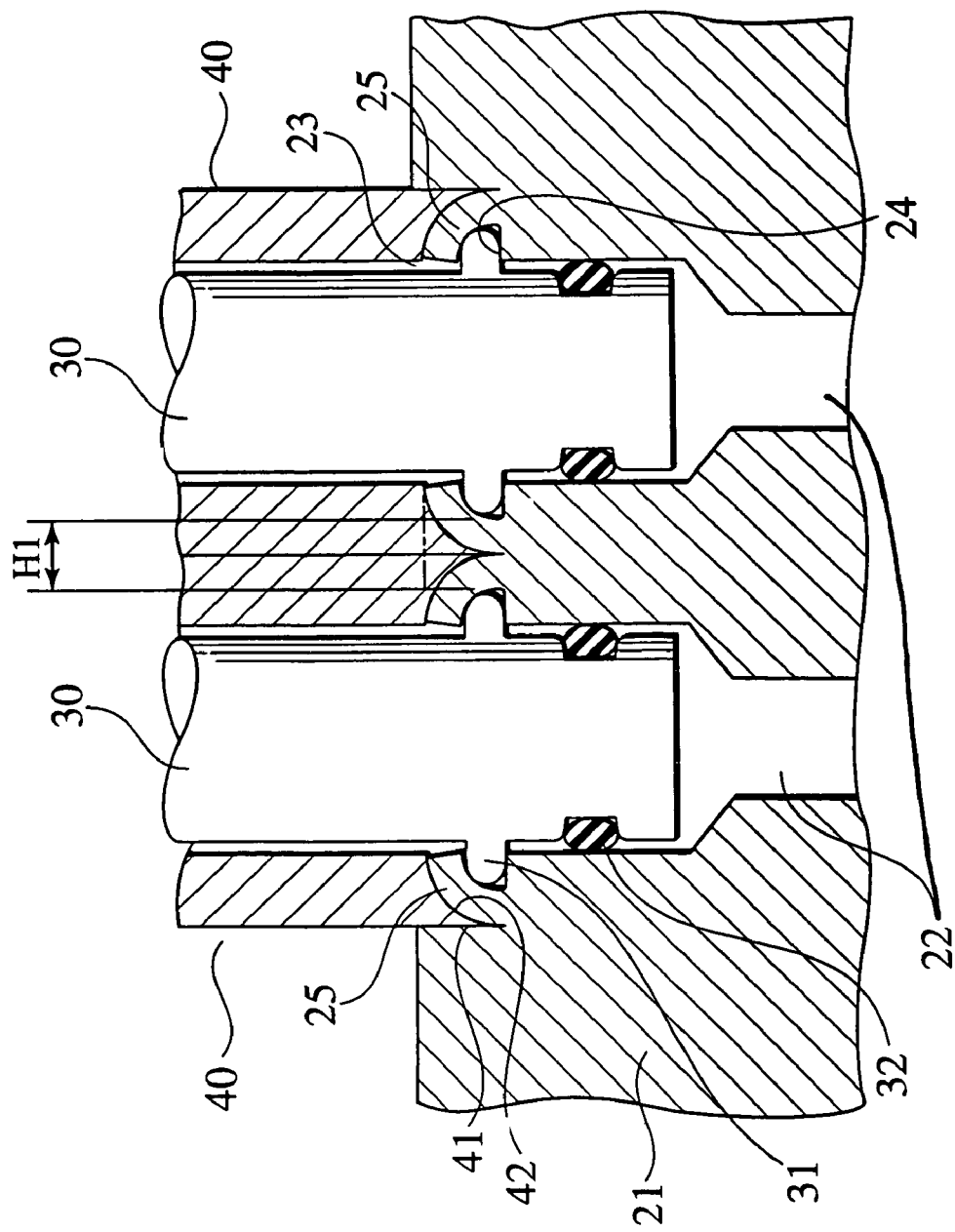

STRUCTURE FOR CONNECTING TWO MEMBERS, METHOD THEREFOR, AND DIE

CROSS REFERENCE TO RELATED APPLICATIONS

This application is based upon and claims the benefit of priority from the prior Japanese Patent Application No. P2002-342787, filed on Nov. 26, 2002; the entire contents of which are incorporated herein by reference.

BACKGROUND OF THE INVENTION

1. Field of the Invention

The present invention relates to a structure for connecting two members, a method therefore, and a die used for the method. In particular, the invention relates to a coolant piping of an air conditioning apparatus for a vehicle which is connected to an expansion valve, or similar devices.

2. Description of the Related Art

In the technical field of an air conditioning apparatus for a vehicle, for example, coolant piping is connected between a liquid tank and a compressor, between a condenser and a liquid tank, or between an expansion valve and an evaporator. In Japanese Patent No. 2591388 publication, a structure where coolant piping is connected to a passage of a block-shaped expansion valve has been disclosed. In the case that a pipe is connected to the passage of the expansion valve, the following steps are conducted in order to provide the connection. An annular recess portion receiving a projection portion formed on an outer periphery of the pipe is first provided on an open end of the passage in the expansion valve. Further, a cylindrical wall for caulking is provided on an outer peripheral portion of the recess portion. Next, the pipe is inserted into the open end of the passage in the expansion valve. Thereby, an O-ring fitted on an outer periphery of the pipe is brought into pressure-contact with an inner periphery of the passage and the projection portion of the pipe is received in the recess portion. Next, the cylindrical wall formed on the outer periphery of the recess portion is bent inwardly to be deformed by a jig, so that the bent and deformed cylindrical wall and the projection portion are engaged with each other and the pipe and the expansion are connected to each other.

In the above-described example, however, it is necessary to cut the surface of the material of the expansion valve so as to cut out the cylindrical wall in advance by a cutting tool such as an end mill. For this reason, the cutting work results in an increased manufacturing cost.

BRIEF SUMMARY OF THE INVENTION

In view of the above circumstances, an object of the present invention is to provide a structure for connecting two members where an amount of cutting work to be performed can be reduced.

The present invention provides a structure for connecting a first member and a second member. The first member has a peripheral wall portion that includes a stepped portion engaged with the second member. The peripheral wall portion is a deformed portion that is deformed inwardly of the stepped portion of the first member. The deformed portion has a thin shape that is provided by a cut section of the peripheral wall portion.

BRIEF DESCRIPTION OF THE DRAWINGS

FIG. 5 is a sectional view showing a connecting structure when the present invention has been applied to connection of two pipes;

DETAILED DESCRIPTION OF THE INVENTION

Hereinafter, embodiments of the present invention will be explained with reference to the accompanying drawings.

Figure 1A:
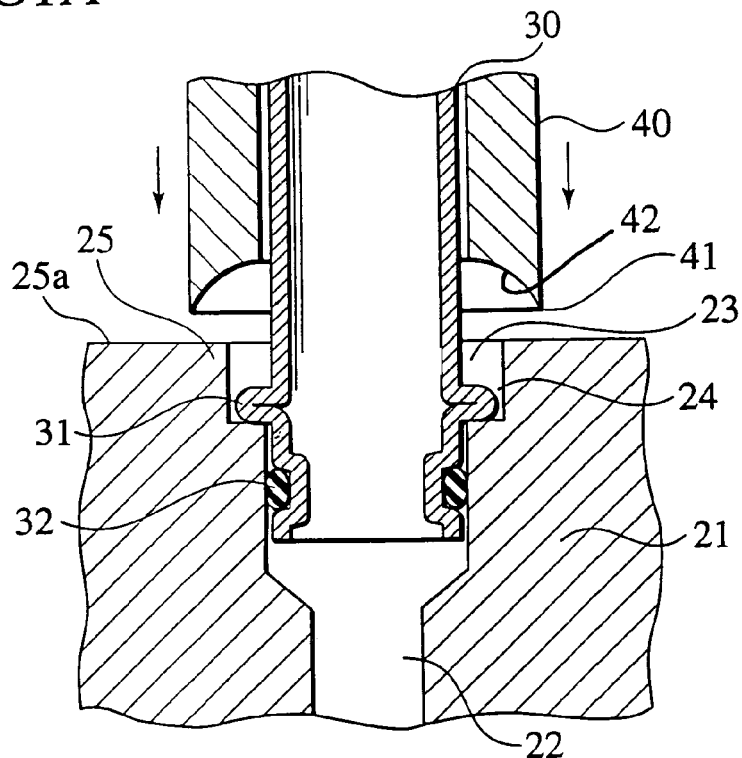
FIGS. 1A and 1B are cross-sectional views of a connecting structure of an embodiment of the present invention, FIG. 1A being a sectional view showing a state of the structures before the connection is conducted, and FIG. 1B being a sectional view showing a state of the structures after the connection is conducted.
Figure 1B:
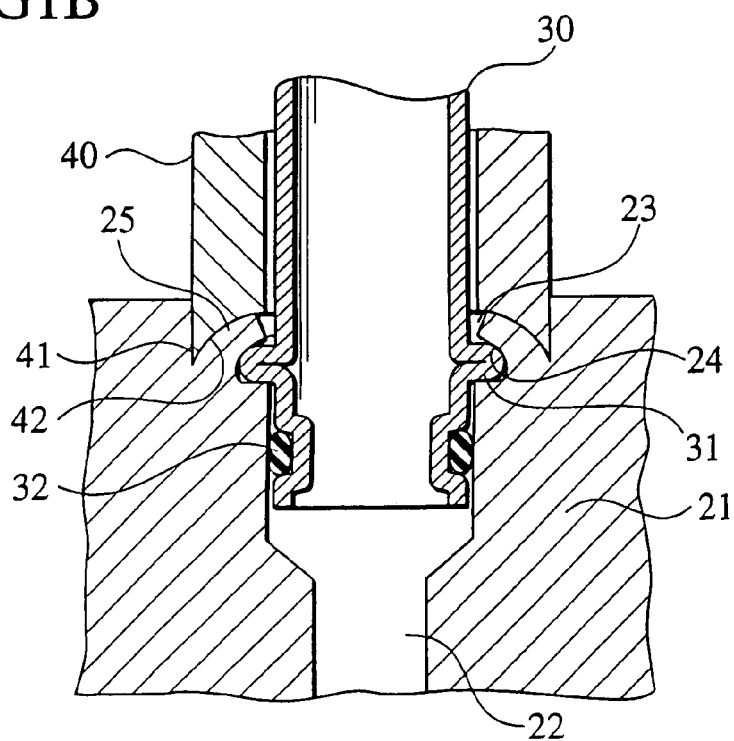

FIGS. 1A and 1B show a connecting structure of an embodiment of the invention in which a distal end of cooling piping such as a pipe 30 is connected to a passage 22 formed inside a block-like member 21 such as an expansion valve or the like.

The pipe 30 is cylindrical. An O-ring 32 for sealing is provided on an outer periphery of a distal end portion of the pipe 30. A projection portion 31 provided in a radial direction is provided on a portion of the pipe 30 on the distal end side (an upper side in FIG. 1A) with regard to the O-ring 32. The projection portion 31 is formed in an annular shape on the outer periphery of the pipe 30.

On the other hand, the member 21 has a circular passage 22 therein.

In order to provide the connecting structure shown in FIG. 1A, a recess portion 24 having a diameter larger than the passage 22 is formed at an open end 23 of the passage 22 in the member 21 in advance. The recess portion 24 is formed in an annular shape so as to receive the annular projection portion 31 of the pipe 30. Next, as shown in FIG. 1A, the distal end of the pipe 30 is inserted into the open end 23 of the passage 22 in the member 21, so that the O-ring 32 fitted on the distal end outer periphery of the pipe 30 is brought into pressure-contact with an inner periphery of the passage 22 and the projection portion 31 of the pipe 30 is received in the recess portion 24. With the above procedure, the inner peripheral face of the recess portion 24 and the outer peripheral end of the projection portion 31 of the pipe are closely adjacent to each other. Further, the projection portion 31 has been completely embedded in the recess portion 24. That is, the projection portion 31 of the pipe 30 is positioned below an end face 25a of a peripheral wall portion 25 inside the recess portion 24.

As shown in FIG. 1B, in the above state, a caulking work is performed by a blade tool 40 for caulking. That is, a distal end of an annular blade portion 41 having an inclined face portion 42 on an inner peripheral side is inserted by pressure into the end face 25a of the peripheral wall portion 25 of the recess portion 24. Thereby, a thin part of the peripheral wall portion 25 of the recess portion 24 is cut from the outside thereof inwardly into the wall portion 25, and the wall portion 25 is bent and deformed inwardly to fix the projection portion 31 by the inclined face portion 42 of the tool 40. Thereby, the connecting structure shown in FIG. 1B can be achieved.

By only pressure-piecing, that is, inserting by pressure, the distal end of the blade portion 41 into the end face of the peripheral wall portion 25 of the recess portion 24 in this manner, the cutting operation of the cylindrical peripheral wall portion 25 and the caulking operation can be performed in the same step, i.e., a single step. Therefore, it is unnecessary to cut a cylindrical wall on a periphery of the recess portion 24 in advance by an end mill in a conventional manner. As a result, the amount of cutting work can be reduced, which results in a reduction in cost.

Figure 14:
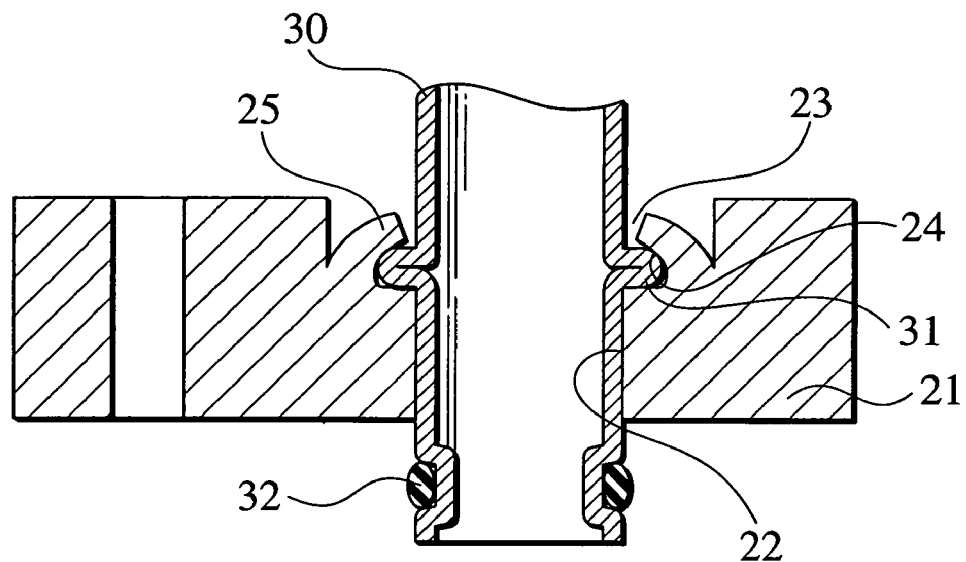
FIG. 14 is a sectional view of a connecting structure of another embodiment of the present invention.

The above-described connecting structure for a pipe shown in FIG. 1 permits the distal end portion of the pipe 30 to be connected to the passage 22 in the member 21. However, a structure can be employed in which the pipe 30 penetrates into the passage 22 of the member 21, as shown in FIG. 14.

Figure 2:
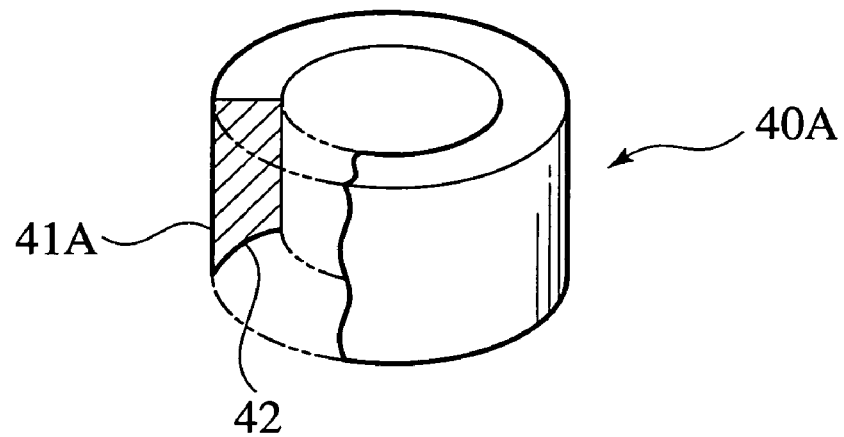
FIG. 2 is a perspective view showing an example of a blade tool for obtaining the connecting structure shown in FIGS. 1A and 1B as a partial section.
Figure 4A:
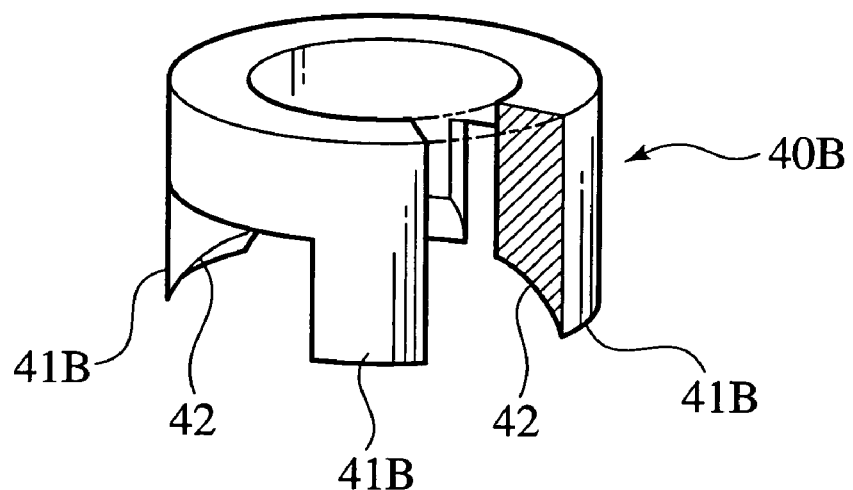
FIGS. 4A and 4B are views showing another example of a blade tool for obtaining the connecting structure shown in FIGS. 1A and 1B, FIG. 4A being a perspective view including a partial section of the blade tool and FIG. 4B being a bottom view of the blade tool.

FIG. 2 and FIG. 4A show examples of a blade tool used for caulking work.

Figure 3:
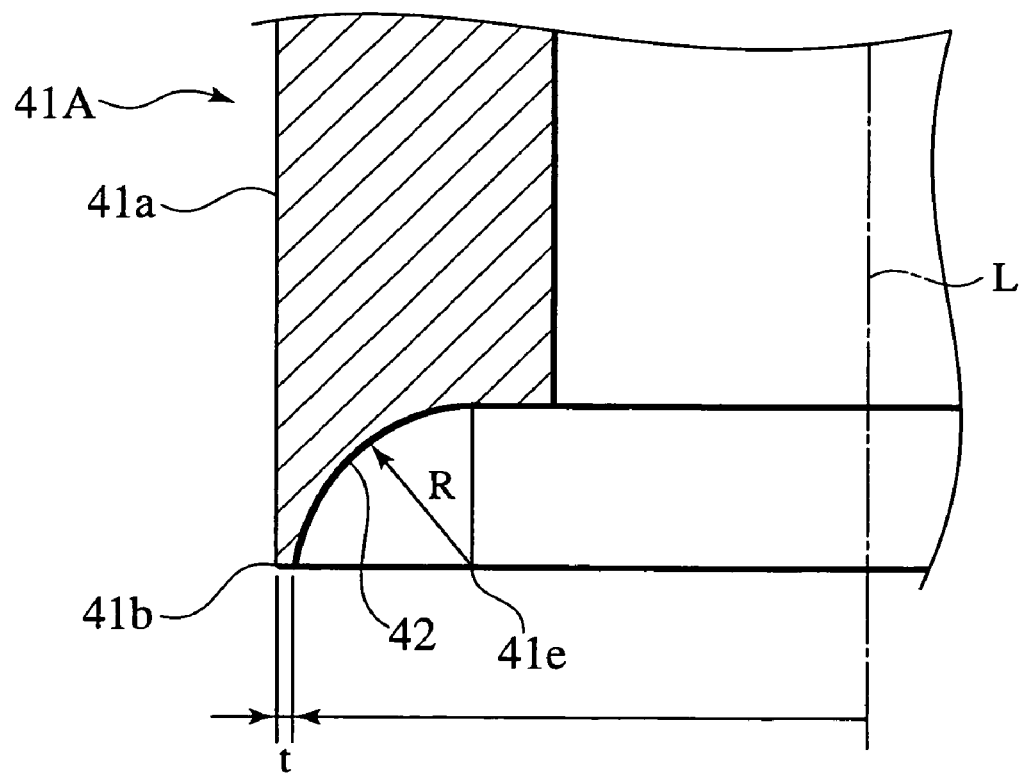
FIG. 3 is an enlarged sectional view of a blade portion of the blade tool shown in FIG. 2.
Figure 15:
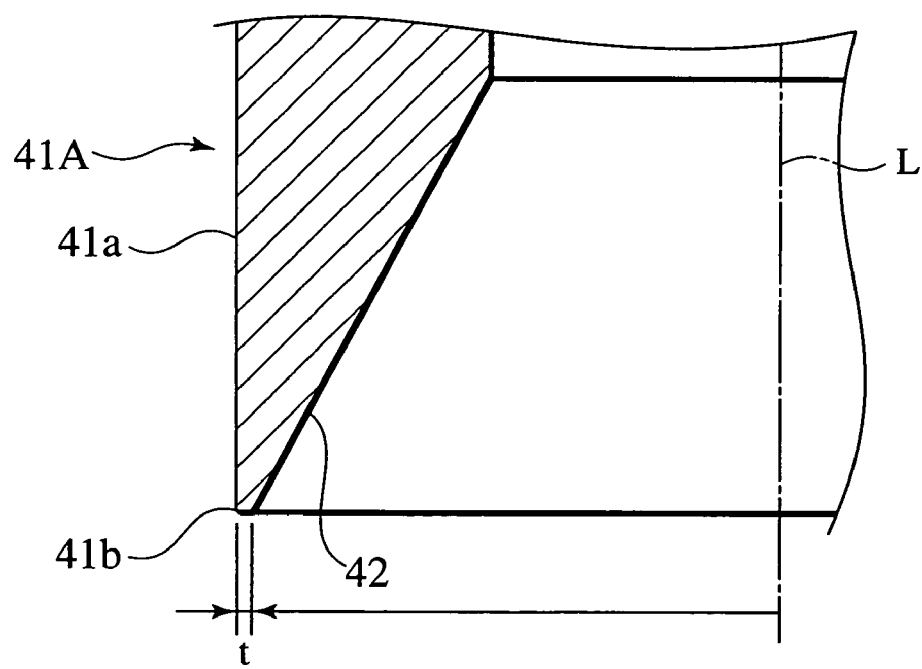
FIG. 15 is an enlarged sectional view showing a modified example of a blade portion of a blade tool.

A blade tool 40A shown in FIG. 2 has an annular blade portion 41A continuously extending in a circumferential direction. As shown in an enlarged manner in FIG. 3, the blade portion 41A has an outer peripheral cylindrical face 41a parallel to the central axial line L of a cylindrical body on an outer periphery of the cylindrical body. The blade portion 41A has a blade edge 41b with a slight thickness t continuous to the outer peripheral cylindrical face 41a. An inclined face portion 42 is provided so as to be contiguous to an inner peripheral face of the blade edge 41b. As illustrated in FIGS. 1A and 1B, the inclined face portion 42 has a shape obtained by forming the blade in such a shape that is recessed with a predetermined curvature R (a curvature center 41e is set at a position having the same height as the blade edge 41b). Such a shape is desirable, as the projection portion 31 of the pipe 30 can be securely fixed by the peripheral wall portion 25. Also, in the present invention, the inclined face portion 42 may have a linear shape as shown in FIG. 15, it may be provided in a convex shape, and the shape is not limited to a specific shape.

Figure 4B:
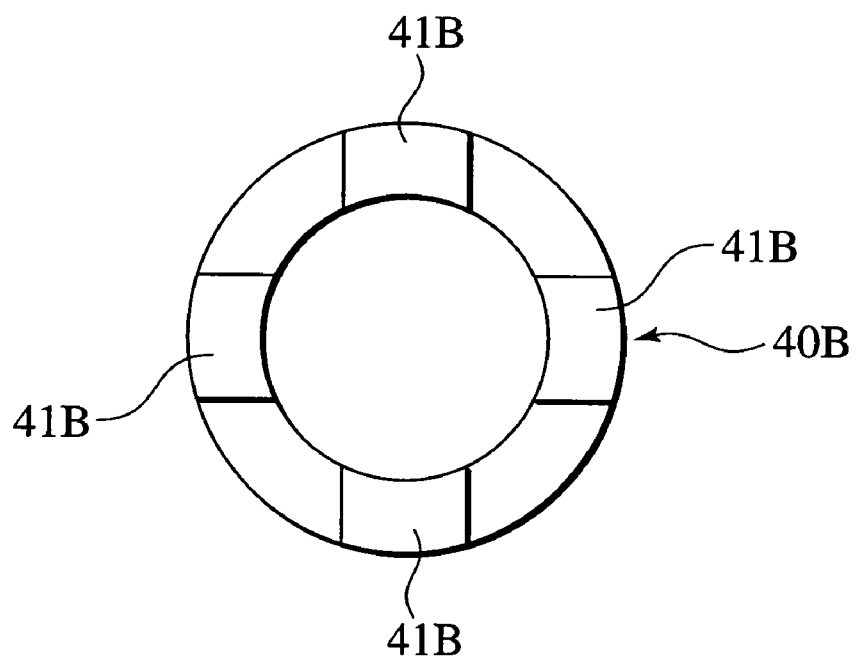

FIGS. 4A and 4B show another example of the blade tool. A blade tool 40B shown in FIGS. 4A and 4B has a plurality of blade portions 41B arranged at equal intervals in a circumferential direction. It is preferable to set the number of the blade portions 41B to any number allowing arrangement at equal interval along the circumferential direction, but the number is not limited to a specific number. A section of each blade portion 41B is similar to that shown in FIG. 3.

In case caulking work is conducted by using the blade tool 40A shown in FIG. 2, while the peripheral wall portion 25 of the recess portion 24 is being cut in a thin cylindrical shape continuously in an annular shape, the entire periphery of the projection portion 31 can be firmly fixed. On the other hand, when caulking work is conducted by using the blade tool 40B shown in FIGS. 4A and 4B, while the peripheral wall portion 35 of the recess portion 24 is being cut in a thin cylindrical shape by the intermittently arrange blade portions 41B, the projection portion 31 can be fixed easily with a small force.

FIG. 5 shows another embodiment of the connecting structure of the invention.

FIG. 5 shows a structure obtained when two passages 22 provided in a member 21 so as to be adjacent to each other are connected with respective pipes 30. A portion of the member 21 with a thickness H1, which allows cutting of respective peripheral wall portions 25 for caulking is provided between two recess portions 24. Thereby, caulking work is possible by the blade tool 40A and the blade tool 40B. In the embodiment shown in FIG. 5, therefore, a distance between the two passages 22 in the member 21 can be reduced. As a result, this embodiment reduces the size of the member 21.

Here, assuming that the related art disclosed in Japanese Patent No. 2591388 is applied to the structure where two passages 2 are provided in a member 1 so as to be adjacent to each other and pipes 10 are respectively connected to the passages 2, a connecting structure as shown in FIGS. 16A and 16B, and FIGS. 17A and 17B is obtained.

Figure 16A:
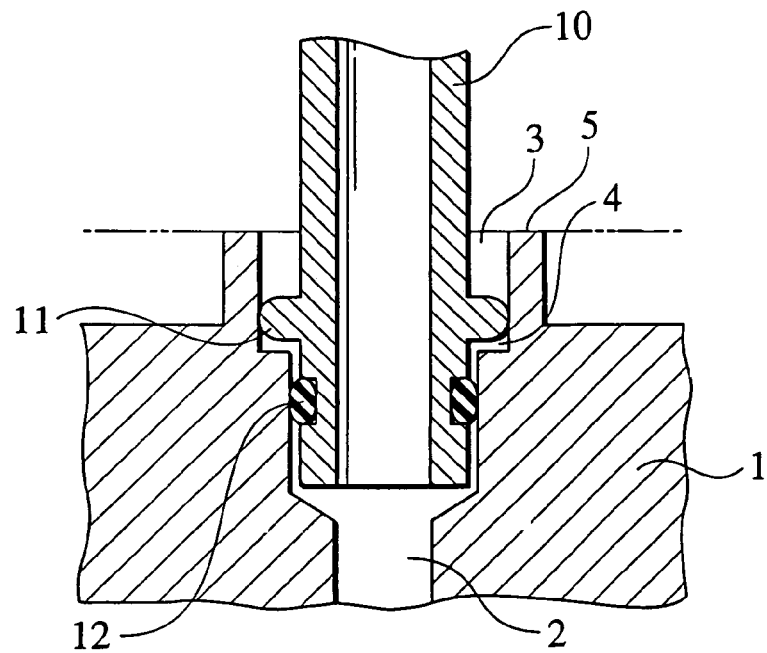
FIGS. 16A and 16B are views of a connecting structure of a pipe where an expansion valve and a pipe are connected to each other, FIG. 16A being a sectional view showing the state of the structures before the connection is conducted and FIG. 16B being a sectional view showing the state of the structures after the connection is conducted.
Figure 16B:
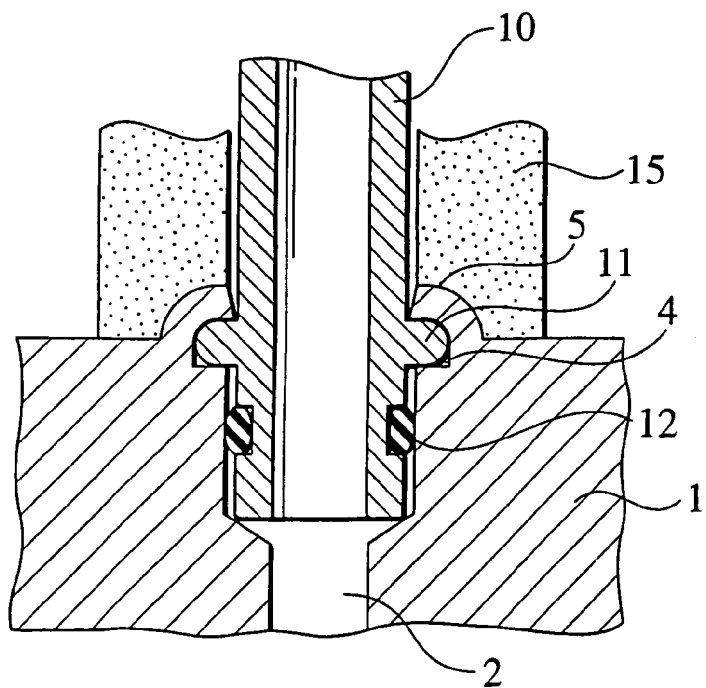
Figure 17A:
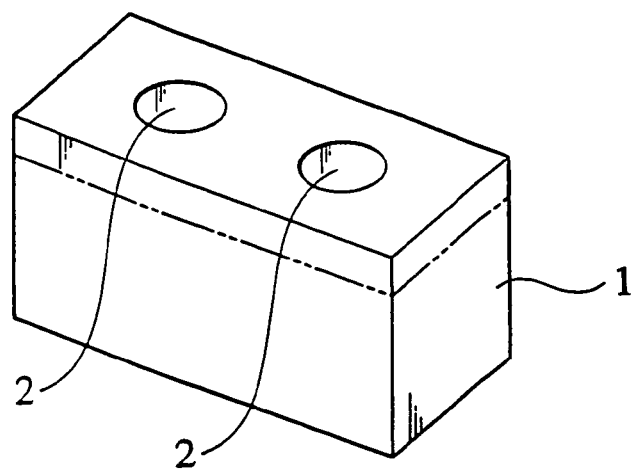
FIGS. 17A and 17B are views for explaining a working method when a cylindrical wall for caulking is prepared on an expansion valve, FIG. 17A being a perspective view of the expansion valve before the cylindrical wall is prepared, and FIG. 17B being a perspective view of the expansion valve after the cylindrical wall has been worked out.
Figure 17B:
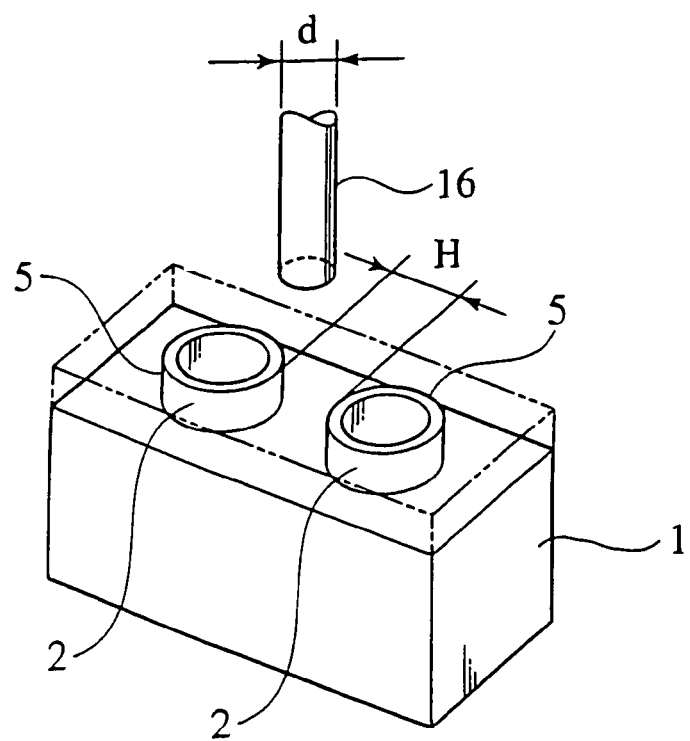

As shown in FIG. 17A, the passages 2 are formed in the member 1 and the recess portions 4 are formed at open ends of the passages 2. Next, as shown in FIG. 17B, cylindrical walls 5 are cut out around the recesses 4 by an end mill. Next, as shown in FIG. 16A, the pipe 10 is inserted into the open end 3 of the passage 2 of the member 1, so that an O-ring 12 provided on an outer periphery of the pipe 10 is brought in pressure-contact with an inner periphery of the passage 2 and the projection portion 11 of the pipe 10 is received in the recess portion 4. Next, as shown in FIG. 16B, by inwardly deforming the cylindrical wall 5 formed about the outer periphery of the recess portion 4 in this state by a caulking jig 15, the projection portion 11 is fixed. The respective pipes 10 and 10 are fixed to the member 1 individually or simultaneously.

For this reason, when the apparatus disclosed in Japanese Patent No. 2591388 is utilized, even if the two cylindrical walls 5 and 5 are to be as close as possible to each other, it is necessary to provide at least the clearance H (FIG. 7B) corresponding to a diametrical size d of an end mill 16 between the two cylindrical portions 5. Consequently, the two passages 2 cannot be arranged to be closely adjacent to each other and the size of the member 1 and the member 11 is increased.

In the embodiment shown in FIG. 5, however, since it is unnecessary to prepare the cylindrical walls on the member 21 in advance by an end mill, the distance between the two passages 22 in the member 21 can be reduced so that the size of the block-like member 21 can be reduced.

In the present invention, in order to further reduce the distance between the passages 22, an arrangement can be employed in which the two recess portions 24 overlap with each other. In that case, such an arrangement can be achieved by performing caulking so as not to caulk the closest portions of the passages 22 and 22. That is, the constitution can be achieved by performing caulking work with a blade tool that does not have a blade portion at a position corresponding to the closest portions of the passages 22 and 22.

Figure 6:
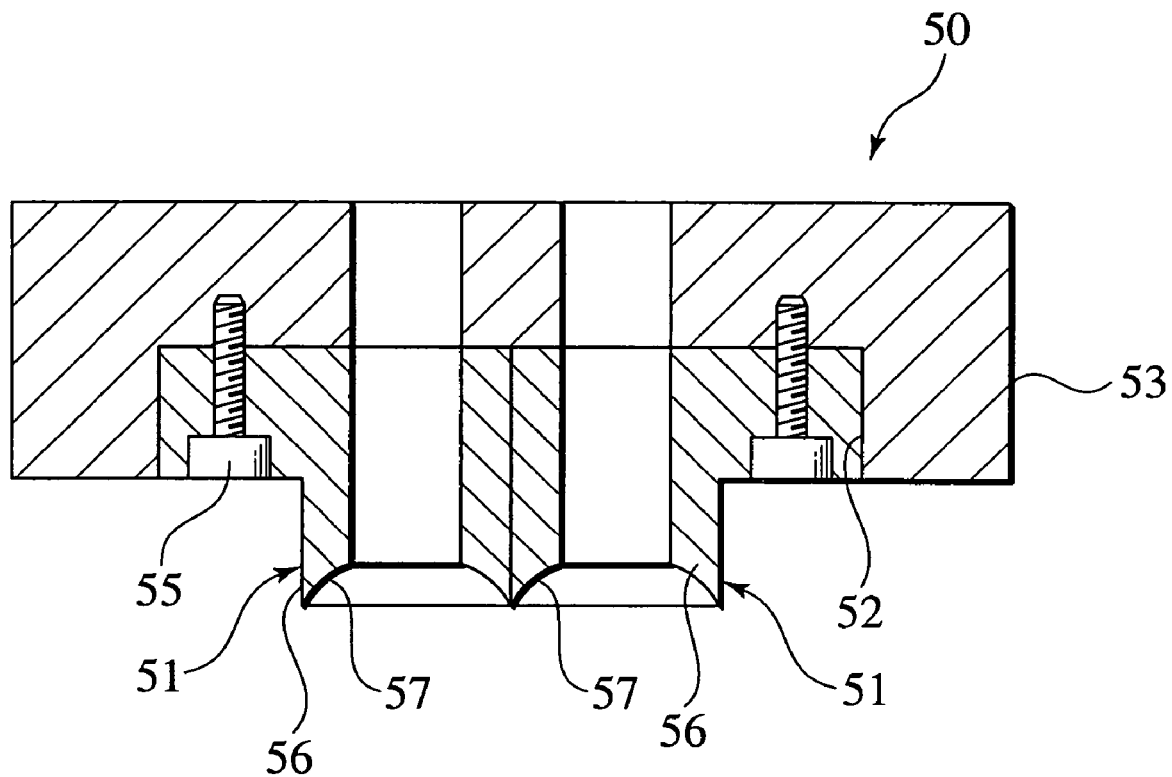
FIG. 6 is a sectional view showing a first example of a caulking die for obtaining the connecting structure shown in FIG. 5.
Figure 7:
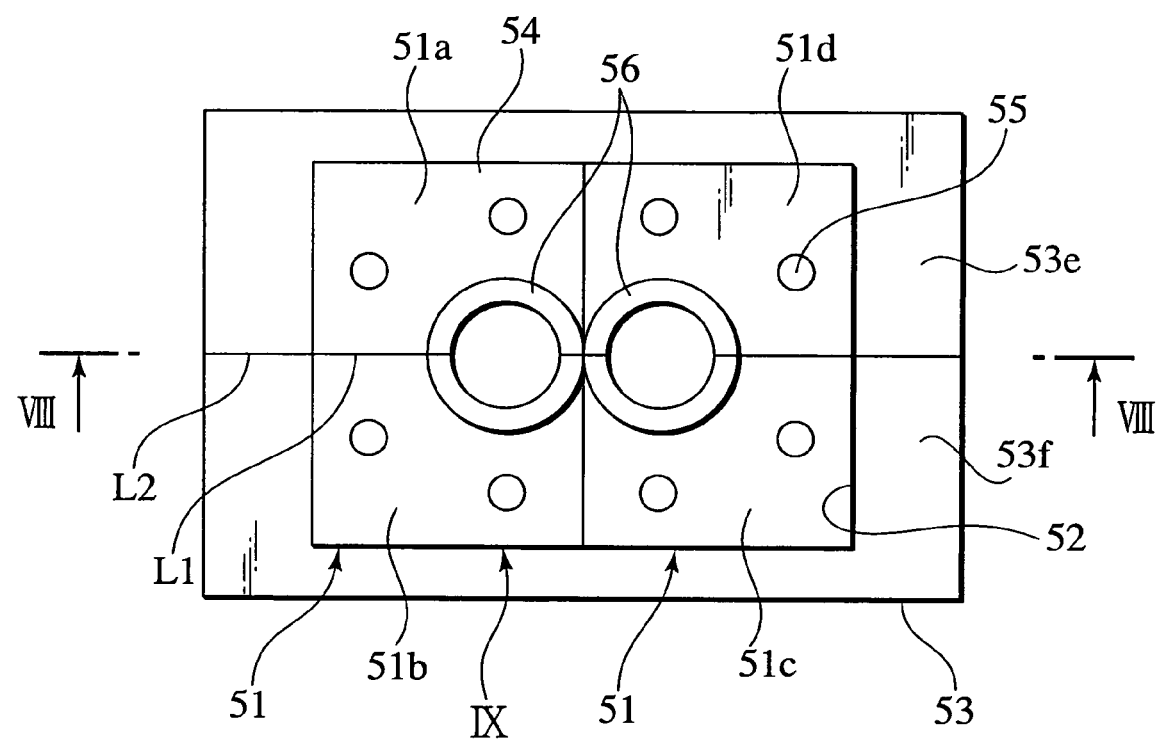
FIG. 7 is a bottom view of the caulking die shown in FIG. 6.
Figure 8:
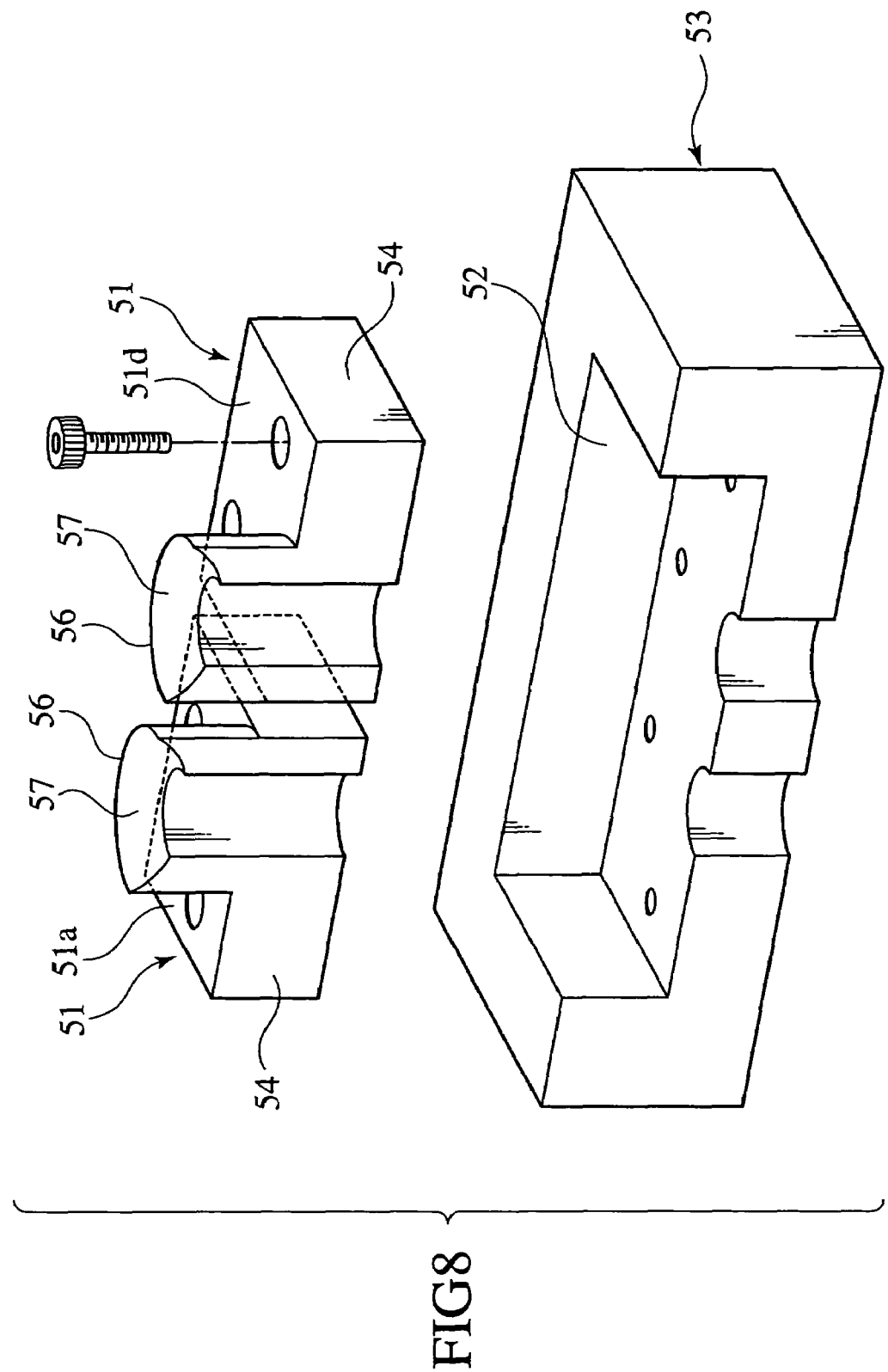
FIG. 8 is a dissolved perspective view of the caulking die viewed from arrow direction VIII-VIII in FIG. 7.
Figure 9:
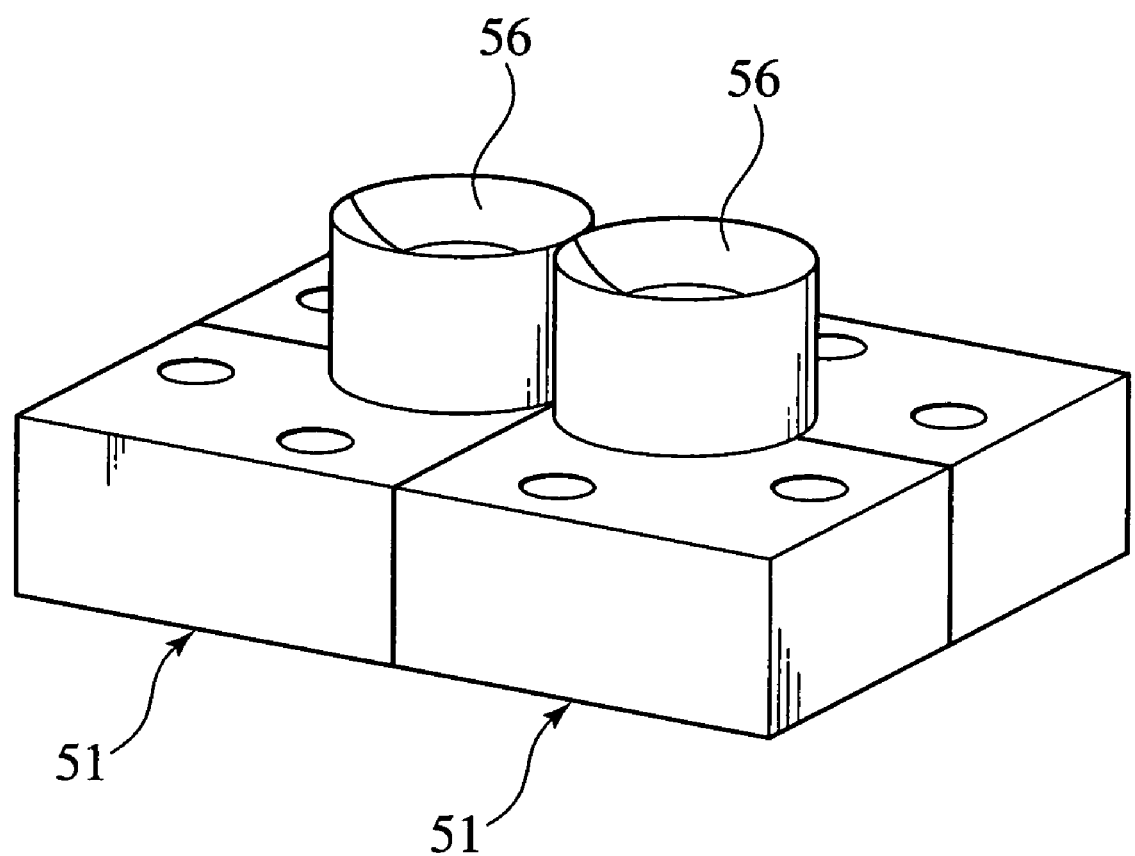
FIG. 9 is a perspective view showing a portion of the caulking die viewed from arrow direction IX-IX in FIG. 7 which has been removed.

FIG. 6 to FIG. 9 are views showing a first example of a caulking die for providing the connecting structure shown in FIG. 5, FIG. 6 being a sectional view, FIG. 7 being a bottom view, FIG. 8 being a dissolved perspective view as viewed in a direction of arrow VIII-VIII in FIG. 7 and FIG. 9 being a perspective view of an arrow IX portion in FIG. 7.

A caulking die 50 comprises two sets of blade tools 51 corresponding to the number of pipes to be connected, and a die main body 53 having a recess portion 52 receiving the two blade tools 51. As each blade tool 51 is constituted by two connected halves that are connected for allowing the pass-through of a pipe, the two sets of blade tools 51 comprise four blocks 51a to 51d. As shown in FIG. 7, the die main body 53 is also divided into two blocks 53e and 53f along a division line L2 coincident with a half division line L1 for the tool 51. Thus, the caulking die 50 is constituted by combining all the blocks 51 a to 51 d and the blocks 53e to 53f.

Here, each of the blocks 51a to 51d constituting the blade tool 51 is provided with a rectangular base plate portion 54, and the four blocks 51 a to 51 d are combined to constitute a rectangular plate. A joined or united caulking die 50 is obtained by fitting the rectangular plate into the recess portion 52 of the die main body 53, fixing the respective blocks Sla to 51d to the die main body 53 by bolts 55 and uniting the two blocks 51e and 51f to each other. Alternatively, the blocks may be provided in a caulking machine (not shown).

In the caulking die 50 thus assembled, two blade tools 51 having an annular blade portion 56 formed at an inner peripheral side with an inclined face portion 57. The blade tools 51 are fitted and fixed in the recess portion 52 of the die main body 53 so that the annular blade portions 56 are circumscribed and blade edges are incident with each other at a contact point, as shown in FIG. 6.

In the caulking die 50, since the blade tool 51 having the annular blade portion 56 is constituted by the two connected half sections, it is easy to insert a pipe inside the annular blade portion 56 or release the blade tool 51 from the pipe inserted inside the annular blade portion 56. Further, since the blade tool 51 is provided with the continuous annular blade portion 56, as shown in FIG. 5, the entire periphery of the cylindrical projection portion 31 of the pipe 30 can be fixed on a member 21 such as an expansion valve or the like in the die 50 so as to provide a high strength pipe connection.

Figure 10:
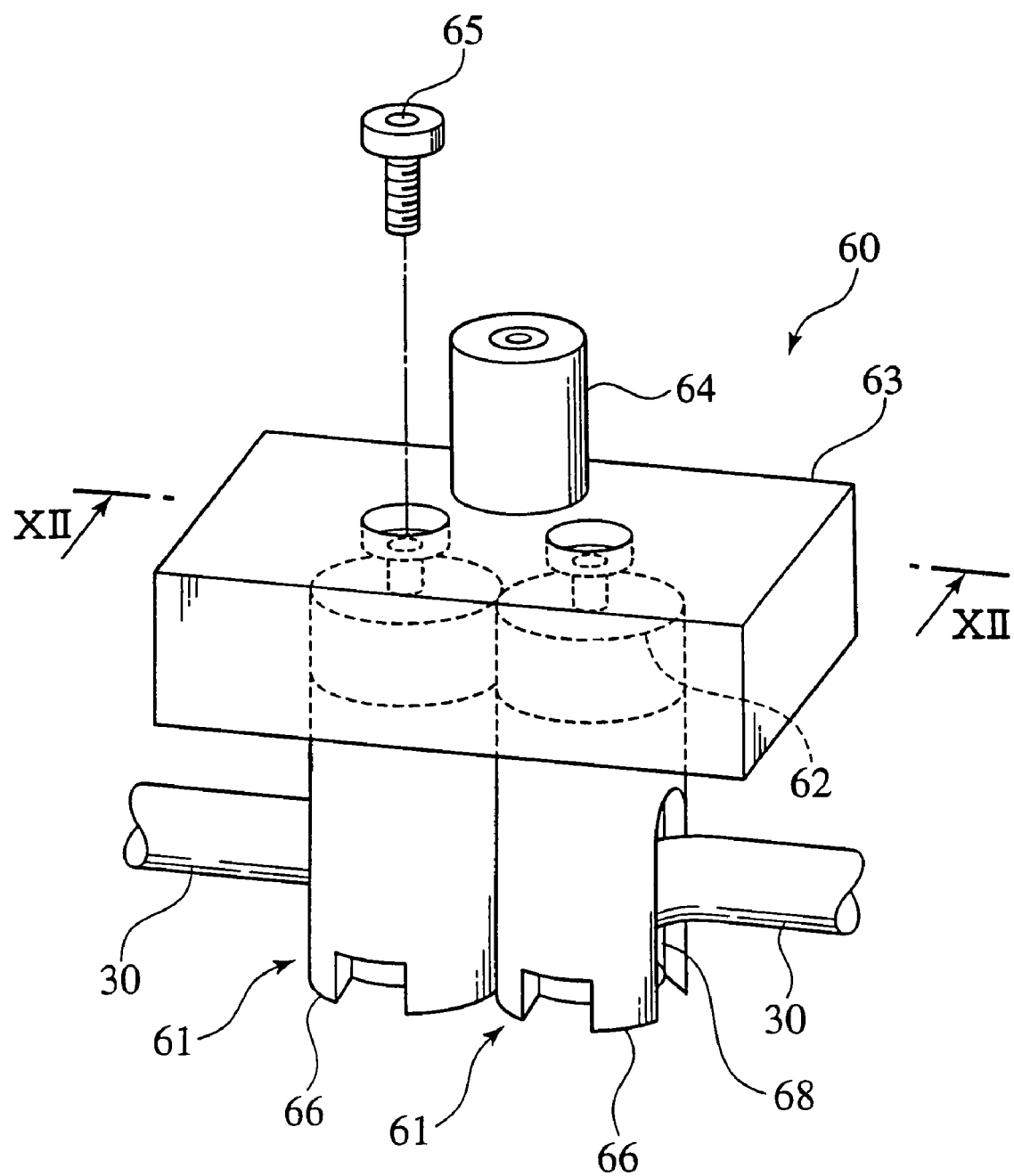
FIG. 10 is a sectional view showing a second example of a caulking die for obtaining the connecting structure shown in FIG. 5.
Figure 11:
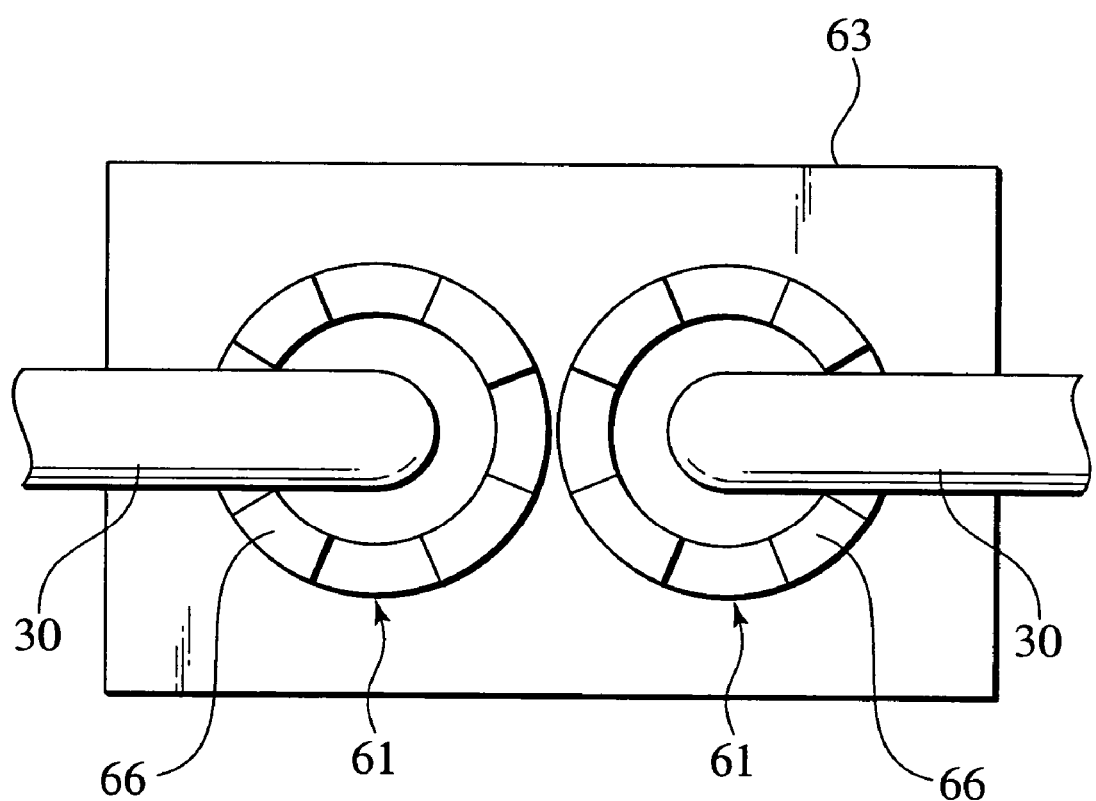
FIG. 11 is a bottom view of the caulking die shown in FIG. 10.
Figure 12:
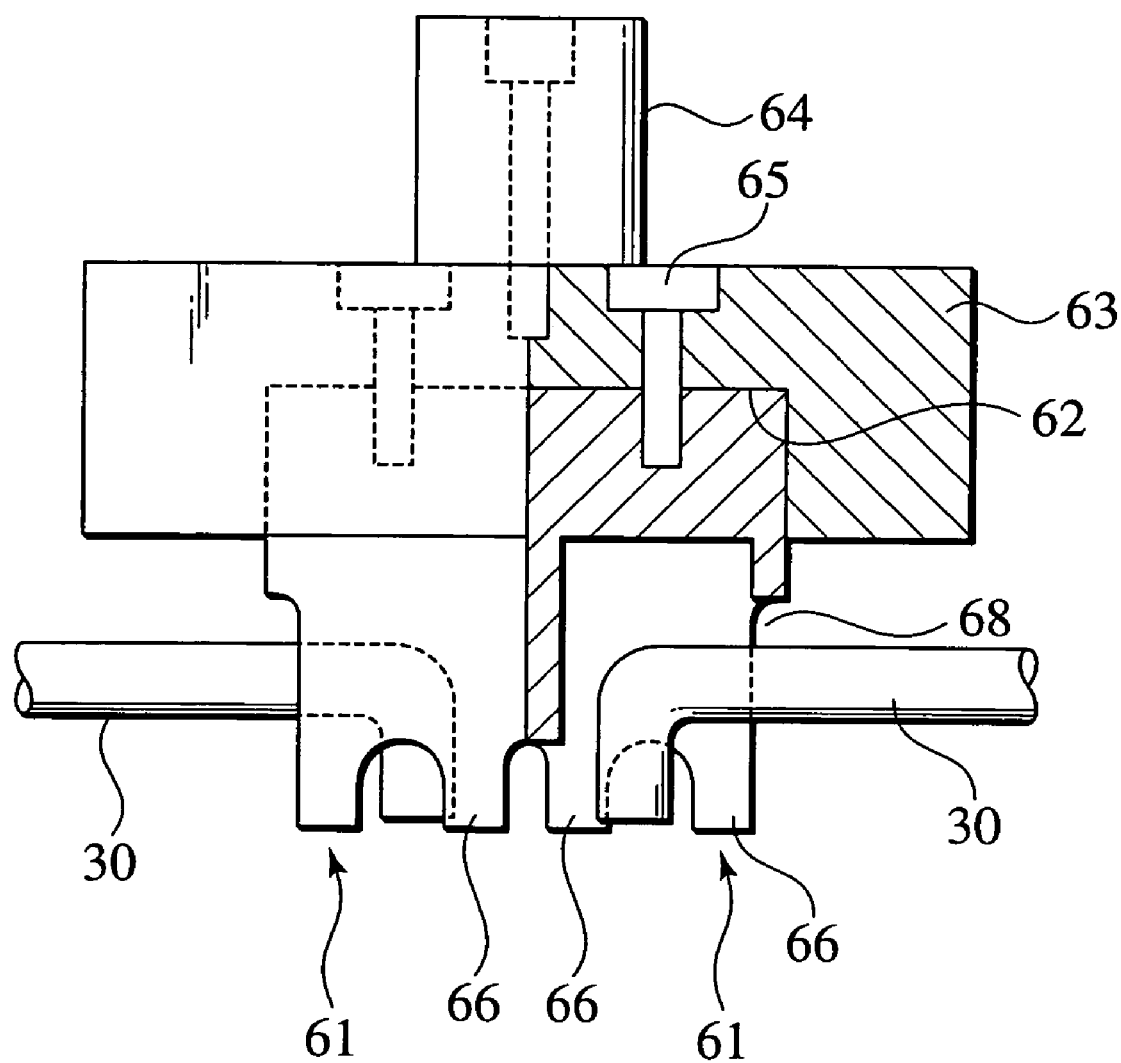
FIG. 12 is a sectional view from arrow direction XII-XII in FIG. 10.
Figure 13:
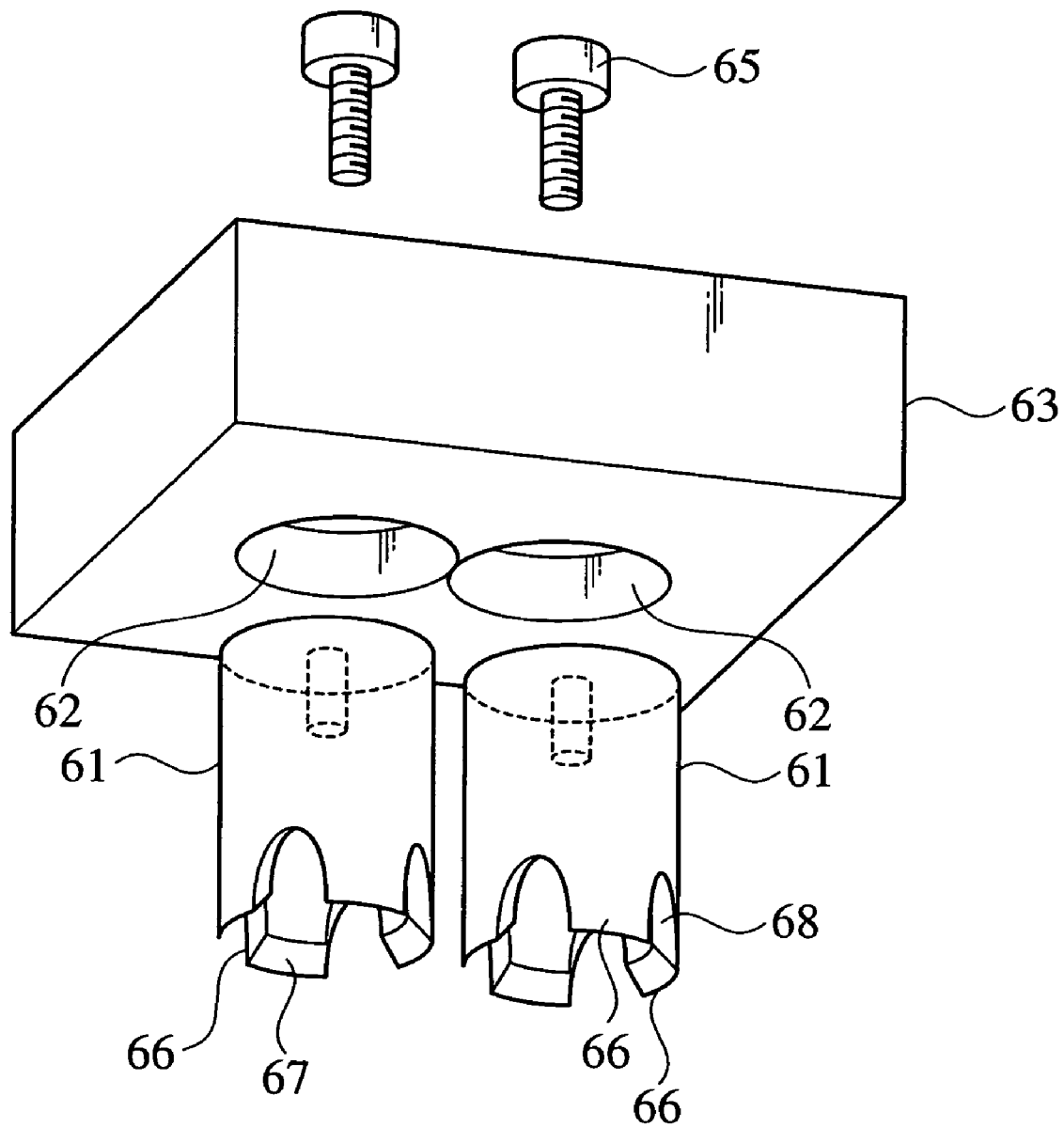
FIG. 13 is a dissolved perspective view of the caulking die shown in FIG. 10 viewed obliquely and upwardly.

FIG. 10 to FIG. 13 are views showing a second embodiment of the caulking die for providing the connecting structure shown in FIG. 5, FIG. 10 being a perspective view, FIG. 11 being a bottom view, FIG. 12 being a sectional view as viewed from arrow XII-XII in FIG. 10 and FIG. 13 being a dissolved perspective view as viewed obliquely and upwardly.

A caulking die 60 comprises two blade tools 61 corresponding to the number of pipes to be connected, a die main body 63 having a recess portion 62 for receiving the two blade tools 61 and a shank portion 64. Each blade tool 61 is constituted by a plurality of intermittent blade portions 66 extending in a circumferential with an inclined face portion 67 on an inner peripheral side on a lower end portion of a cylindrical blade tool main body. The blade tool 61 includes a long groove or hole 68 for allowing pass-through of a pipe 30 between one set of blade portions 66. The caulking die 60 of this embodiment is constituted by fitting the number of blade tools 61 corresponding to the number of pipes into the recess portion 62 of the die main body 63 to fix the blade tools 61 with a bolt 65. In the caulking die 60, two cylindrical blade tools 61 are adjacently arranged so that their outer peripheries come in contact with each other.

In the caulking die 60, since each blade tool 61 is constituted by the intermittent, circumferential blade portions 66, a force required for a cutting operation of a peripheral wall portion of the recess portion 24 and a caulking operation thereof can be reduced, as compared with a case in which the above-described entire periphery caulking work is conducted, which results in excellent workability. Further, since the long groove 68 is provided between the blade portions 66, the pipe 30 can easily be taken in and out of the blade portion 66.

Having described the present invention in detail with reference to the embodiments, it is clear that the present invention is not limited to the embodiments described above. In the apparatus according to the invention, modifications or changes of embodiments can be made without departing from the sprit or scope of the invention as defined in the appended claims. Therefore, the description in this application is merely illustrative and not at all restrictive to the invention.

What is claimed is:

1. A connecting structure of a pipe connected to a passage formed in a member, comprising:
   a projection portion that projects from the pipe radially outwardly;
   a recess portion that is provided at an open end of the passage formed in the member and that receives the projection portion of the pipe,
   wherein the recess portion is defined by a peripheral wall portion that includes a thin-shaped deformed portion that is defined by a groove formed in an outer end face of the peripheral wall portion,
   wherein the deformed portion is inclined and curved inwardly toward the recess portion such that an inner surface of the deformed portion is formed in a concave shape and an outer surface of the deformed portion is formed in a convex shape,
   wherein the deformed portion is positioned axially within an outer end surface of the peripheral wall portion and is engaged with the projection portion, and
   wherein the projection portion of the pipe, which is inserted into the opening end of the passage in the member, abuts the inner surface of the deformed portion.

2. The connecting structure of a pipe according to claim 1,
- wherein the projection portion has an annular shape on an outer periphery of the pipe,
- wherein the recess portion has an annular shape on an outer periphery of the passage in the member, and
- wherein the peripheral wall portion is deformed inwardly in a continuous annular shape.

3. The connecting structure of a pipe according to claim 1,
- wherein the projection portion has an annular shape on an outer periphery of the pipe,
- wherein the recess portion has an annular shape on an outer periphery of the passage in the member, and
- wherein the peripheral wall portion is bent and deformed inwardly at intermittent sections in a circumferential direction.

4. A connecting method for connecting a pipe to a passage formed in a member, comprising:
- a first step of inserting the pipe in the passage formed in the member and receiving a flange portion formed on an outer periphery of the pipe in a recess portion formed at an open end of the passage in the member and that receives a projection portion of the pipe, the projection portion projecting from the pipe radially outwardly; and
- a second step of, while cutting a peripheral wall portion of the recess portion in a thin shape, bending and deforming the cut portion of the peripheral wall portion inwardly to engage the inwardly bent and deformed peripheral wall portion with the projection portion,
- wherein the recess portion is defined by a peripheral wall portion that includes a thin-shaped deformed portion that is defined by a groove formed in an outer end face of the peripheral wall portion,
- wherein the deformed portion is inclined and curved inwardly toward the recess portion such that an inner surface of the deformed portion is formed in a concave shape and an outer surface of the deformed portion is formed in a convex shape,
- wherein the deformed portion is positioned axially within an outer end surface of the peripheral wall portion and is engaged with the projection portion, and
- wherein the projection portion of the pipe, which is inserted into the opening end of the passage in the member, abuts the inner surface of the deformed portion.

5. The connecting method according to claim 4, wherein the second step is achieved by pressure-piecing a blade portion that has an inclined face portion into a peripheral edge of the recess portion.

6. The connecting method according to claim 5,
- wherein the flange portion and the recess portion are annular, and
- wherein the blade portion is continuously formed in an annular shape.

7. The connecting method according to claim 5,
- wherein the flange portion and the recess portion are annular, and
- wherein the blade portion is formed in plural sections intermittently in a circumferential direction.

8. The connecting structure of a pipe connected to a passage formed in a member, comprising:
- a projection portion projects from the pipe radially outwardly; and
- a recess portion that is provided at an open end of the passage formed in the member and that receives the projection portion of the pipe;
- wherein the recess portion is defined by a peripheral wall portion that includes a thin-shaped deformed portion, the deformed portion is defined by a groove formed in an outer end face of the peripheral wall portion at a distance from the recess portion and is deformed radially inward with respect to the recess portion, wherein the deformed portion is inclined and curved inwardly toward the recess portion such that the outer face of the deformed portion is formed in a convex shape, and the inner face of the deformed portion is engaged with and abuts the projection portion.

9. The connecting structure according to claim 8,
- wherein the inner face of the deformed portion is formed in a concave shape.

* * * * *